US009552786B2

(12) United States Patent
Shikata

(10) Patent No.: US 9,552,786 B2
(45) Date of Patent: Jan. 24, 2017

(54) ELECTRONIC APPARATUS AND DISPLAY DRIVER

(71) Applicant: Synaptics Japan GK, Tokyo (JP)

(72) Inventor: Atsushi Shikata, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 118 days.

(21) Appl. No.: 14/665,386

(22) Filed: Mar. 23, 2015

(65) Prior Publication Data

US 2015/0279295 A1 Oct. 1, 2015

(30) Foreign Application Priority Data

Mar. 28, 2014 (JP) ................................ 2014-068597

(51) Int. Cl.
*G06F 3/038* (2013.01)
*G09G 3/36* (2006.01)

(52) U.S. Cl.
CPC .......... *G09G 3/3614* (2013.01); *G09G 3/3607* (2013.01); *G09G 3/3648* (2013.01); *G09G 3/3688* (2013.01); *G09G 2300/0426* (2013.01); *G09G 2300/0823* (2013.01); *G09G 2310/0291* (2013.01); *G09G 2310/08* (2013.01)

(58) Field of Classification Search
CPC ............ G09G 3/3614; G09G 2310/027; G09G 2310/0297; G09G 3/3696; G09G 2310/0291; G09G 2300/0426; G09G 3/3655; G09G 2320/0233; G09G 2320/0247; G09G 2310/0251; G09G 3/3659; G09G 2310/0286
USPC ................. 345/204, 209, 690, 211, 212, 213
See application file for complete search history.

(56) References Cited

U.S. PATENT DOCUMENTS

| | | | | |
|---|---|---|---|---|
| 7,030,865 B2 * | 4/2006 | Ishiyama | G09G 3/2011 | 345/204 |
| 7,443,373 B2 * | 10/2008 | Imagawa | G09G 3/006 | 345/87 |
| 7,495,650 B2 * | 2/2009 | Murade | G09G 3/3688 | 345/103 |
| 2007/0298803 A1 | 12/2007 | Kawabata et al. | | |

* cited by examiner

*Primary Examiner* — Duc Dinh
(74) *Attorney, Agent, or Firm* — Patterson + Sheridan, LLP

(57) ABSTRACT

In case that a terminal gradation signal output terminal in a pre-stage display driver and an initial gradation signal output terminal in a next-stage display driver of a plurality of display drivers which are arranged in parallel are used in driving the same gradation signal electrode of a display panel, an output of dummy data from the other gradation signal output terminal which mutually competes with an output timing of a gradation signal from one gradation signal output terminal between both the gradation signal output terminals is suppressed by high impedance control of a corresponding gradation signal output terminal.

20 Claims, 12 Drawing Sheets

ELECTRONIC APPARATUS AND DISPLAY DRIVER

CROSS-REFERENCE TO RELATED APPLICATIONS

The Present application claims priority from Japanese application JP 2014-068597 filed on Mar. 28, 2014, the content of which is hereby incorporated by reference into this application.

BACKGROUND

The invention relates to an electronic apparatus that performs display and drive of a display panel using a plurality of display drivers for displaying and driving sub-pixels by inverting the sub-pixels to different polarities at the interval of single or multiple sub-pixels, and a display driver suitable for such an electronic apparatus, and relates to, for example, a technique effective in a case of application to a portable device provided with an active matrix-type liquid crystal panel, or the like.

A so-called dot inversion drive system that displays and drives sub-pixels by inverting the sub-pixels to different polarities at the interval of single or multiple sub-pixels is adopted for the purpose of mitigating a deterioration in the characteristics of a liquid crystal generated by continuously driving the sub-pixels with the same polarity, and the polarity inversion of the sub-pixels is performed, for example, in units of display frames. There is JP-A-2007-298803 as an example of a document in which the so-called dot inversion drive system is described.

SUMMARY

One embodiment of the present disclosure includes an electronic apparatus including a display panel and a plurality of display drivers which are disposed in series at an edge of the display panel in order to drive the display panel. The display panel includes a plurality of sub-pixels in which selection terminals are connected to scanning signal electrodes and signal input terminals are connected to gradation signal electrodes, where the plurality of sub-pixels form a plurality of scanning lines that extend in a direction of the scanning signal electrodes and a plurality of signal lines that extend in a direction of the gradation signal electrodes. The sub-pixels in a same signal line are alternately connected to adjacent gradation signal electrodes that are disposed either on a first side of the same signal line or on a second, opposite side of the same signal line. The display drivers are configured to supply gradation signals to a plurality of gradation signal electrodes in a parallel manner while driving the scanning signal electrodes in a predetermined order. A first gradation signal output terminal disposed on a first display driver of the plurality of display drivers is adjacent to a second gradation signal output terminal disposed on a second display driver of the plurality of display drivers, where the first and second gradation signal output terminals are connected to a common gradation signal electrode of the gradation signal electrodes. The first and second display drivers are adjacently located to each other at the edge of the display panel and suppress an output of dummy data from the first and second gradation signal output terminals by using high impedance control associated with the first and second gradation signal output terminals to control an output of a gradation signal onto the common gradation signal electrode.

Another embodiment of the present disclosure is a display driver that includes a plurality of gradation signal output terminals, arranged in parallel, configured to output gradation signals in a parallel manner, a plurality of first output buffers configured to output a gradation signal of a first polarity to the gradation signal output terminals, a plurality of second output buffers configured to output a gradation signal of a second polarity to the gradation signal output terminals, an output switch circuit configured to switchably connect the first output buffers and second output buffers to corresponding gradation signal output terminals, and a timing control circuit configured to control an output of a gradation signal to a corresponding gradation signal output terminal from each of the first output buffers and the second output buffers in synchronization with display timing while alternately switching a switch state of the output switch circuit at a predetermined timing. Outputs of the first output buffers and the second output buffers that are selectively connected to gradation signal output terminals located on opposite ends of the display driver are configured to be selectively controlled in a high impedance state. Moreover, the timing control circuit is configured to control the outputs in a high impedance state based on a dummy data output timing of one of the first output buffers and the second output buffers that are selectively connected to the gradation signal output terminals located on opposite ends of the display driver.

Another embodiment of the present disclosure is a display driver which is formed in one semiconductor substrate. The display driver including a plurality of gradation signal output terminals, arranged in parallel, configured to output gradation signals in a parallel manner, a plurality of first output buffers configured to output a gradation signal of a first polarity to the gradation signal output terminals, a plurality of second output buffers configured to output a gradation signal of a second polarity to the gradation signal output terminals, an output switch circuit configured to switchably connect the first output buffers and second output buffers to corresponding gradation signal output terminals, and a timing control circuit configured to control an output of a gradation signal to a corresponding gradation signal output terminal from each of the first output buffers and the second output buffers in synchronization with display timing while alternately switching a switch state of the output switch circuit at a predetermined timing. Moreover, outputs of the first output buffers and the second output buffers that are selectively connected to gradation signal output terminals located on opposite ends of the display driver are configured to be selectively controlled in a high impedance state. Further, the timing control circuit is configured to suppress an output of dummy data from at least one of the first output buffers and at least one of the second output buffers that are selectively connected to the gradation signal output terminals located on opposite ends of the display driver by using a high impedance control signal of the at least one of the first output buffers and the at least one of the second output buffers.

DETAILED DESCRIPTION

The present disclosure describes a technique for driving a display panel by arranging a plurality of display drivers that perform so-called dot inversion drive in parallel. The so-called dot inversion drive is a system that performs dot inversion drive in a zigzag. That is, the system is a drive system that performs dot inversion not only on a scanning line along the scanning direction of the display panel, but also on a signal line which is driven by a gradation signal. As compared to a case where dot inversion is simply performed only on the scanning line, it is possible to contribute to the uniformity of display and low power consumption.

Figure 7:
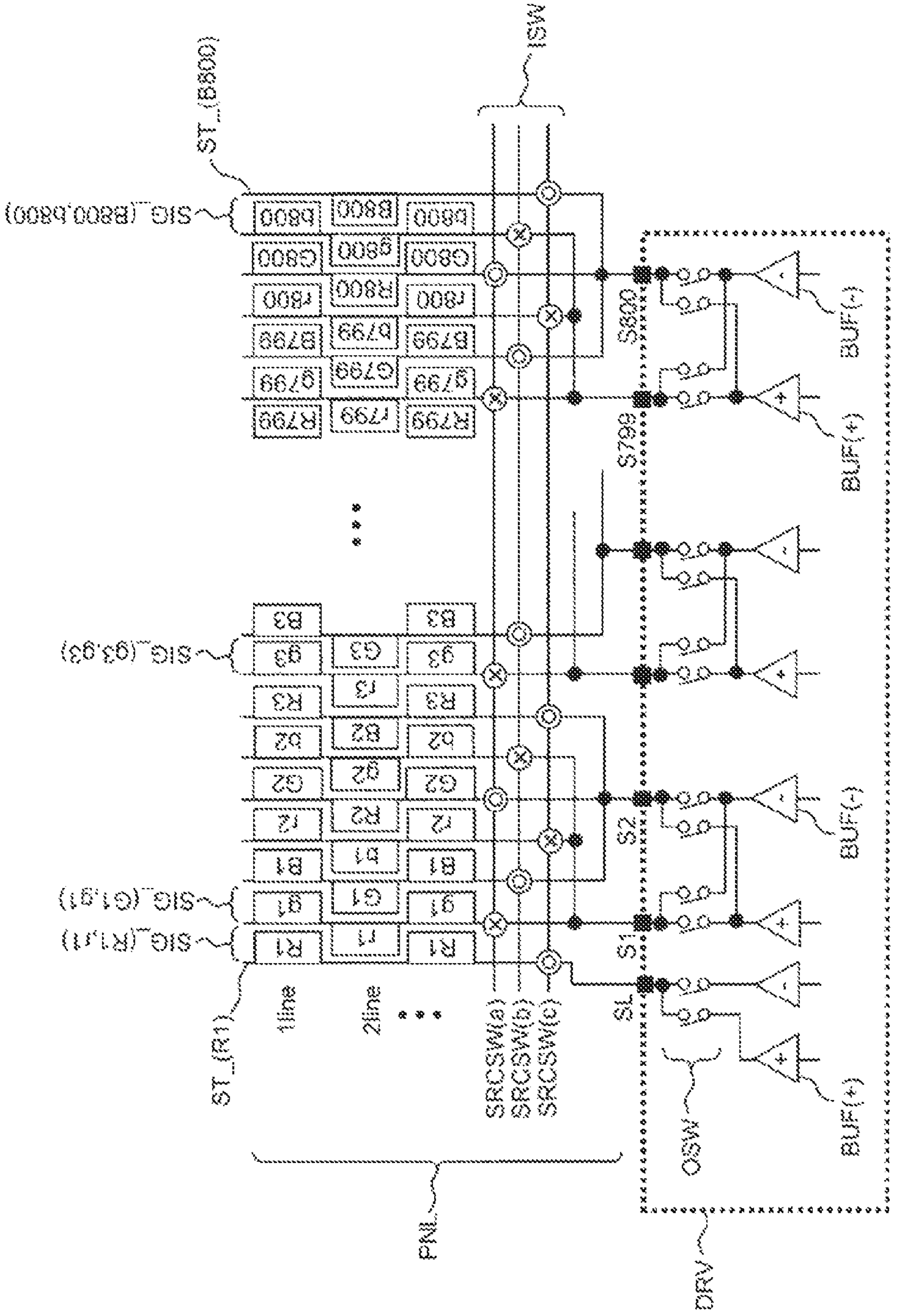
FIG. 7 is a diagram illustrating a fundamental configuration of a display panel on which dot inversion driven in zigzag is performed and a display driver that drives the panel.

In order to make the problems easier to understand, first, a description will be given of a case where a display panel is driven by one display driver. In this case, as illustrated in FIG. 7, a plurality of signal lines SIG_(R1, r1) to SIG_(b800, B800) in which sub-pixels are disposed in the extending direction of gradation signal electrodes ST_(R1) to ST_(B800) such as a source line are formed in a display panel PNL, and sub-pixels on the same signal line are alternately connected to gradation signal electrodes on one side or the other side which are next to each other, for example, sequentially at the interval of one electrode. The leading gradation signal electrode ST_(R1) is driven by the output of a gradation signal output terminal SL of a display driver DRV, and the terminal gradation signal electrode ST_(B800) is driven by the output of a gradation signal output terminal S800 of the display driver DRV. The leading gradation signal electrode ST_(R1) and the terminal gradation signal electrode ST_(B800) are different from other gradation signal electrodes, and have anomalous connection between pixels. Thereby, pixels on even-numbered scanning lines are not connected to the leading gradation signal electrode ST_(R1), and pixels on odd-numbered scanning lines are not connected to the terminal gradation signal electrode ST_(B800). Here, the gradation signal electrodes ST_(R1) to ST_(B800) are provided with first output buffers BUF(+) that output a positive-polarity gradation signal and second output buffers BUF(−) that output a negative-polarity gradation signal with an output switch circuit (OSW) interposed therebetween, and the outputs of the buffers BUF(+) and BUF(−) which are connected to, for example, corresponding gradation signal output terminals are switched by the OSW for each display frame. Each of the gradation signal output terminals S1 to S800 is connected to each of three gradation signal electrodes driven with the same polarity at the interval of one electrode through an input switch circuit (ISW). The ISW sequentially changes over switches which are set to be in an on-state in a time-division manner for each scanning line by three switch signals SRCSW(a) to SRCSW(c). In the drawing of the application, One group of the sub-pixels of red, green, and blue which are driven with the same polarity is indicated by Rx, Gx, and Bx, and the other group is indicated by rx, gx, and bx. Here, x is a pixel number.

Figure 8:
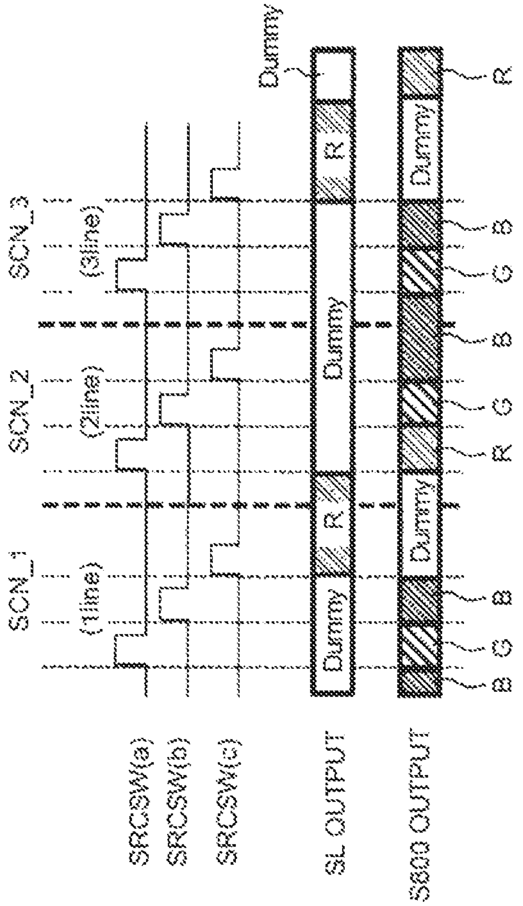
FIG. 8 is a timing diagram illustrating output data of gradation signal output terminals relating to a leading gradation signal electrode and a terminal gradation signal electrode which have anomalous connection between pixels.

FIG. 8 illustrates output data of the gradation signal output terminals SL and S800 relating to the leading gradation signal electrode ST_(R1) and the terminal gradation signal electrode ST_(B800) having anomalous connection between pixels. In the output data of the leading gradation signal output terminal SL, red data is output in synchronization with the high pulse of the switch signal SRCSW(c) on odd-numbered lines (1line, 3line, . . . ), and dummy data (Dummy) is output at other timings. In the output data of the terminal gradation signal output terminal S800, green data is output in synchronization with the high pulse of the switch signal SRCSW(a) on the odd-numbered lines (1line, 3line, . . . ), blue data is output in synchronization with the high pulse of the switch signal SRCSW(b), dummy data is output in synchronization with the high pulse of the switch signal SRCSW(c), red data is output in synchronization with the high pulse of the switch signal SRCSW(a) on even-numbered lines (2line, 4line, . . . ), green data is output in synchronization with the high pulse of the switch signal SRCSW(b), and blue data is output in synchronization with the high pulse of the switch signal SRCSW(c). The dummy data is predetermined data such as, for example, black color data (all pixels are zero) or the immediately preceding color data.

On the premise of the above display driver DRV that performs zigzag dot inversion drive, problems in case that the display driver DRV is used in parallel will be described below in detail.

Figure 3:
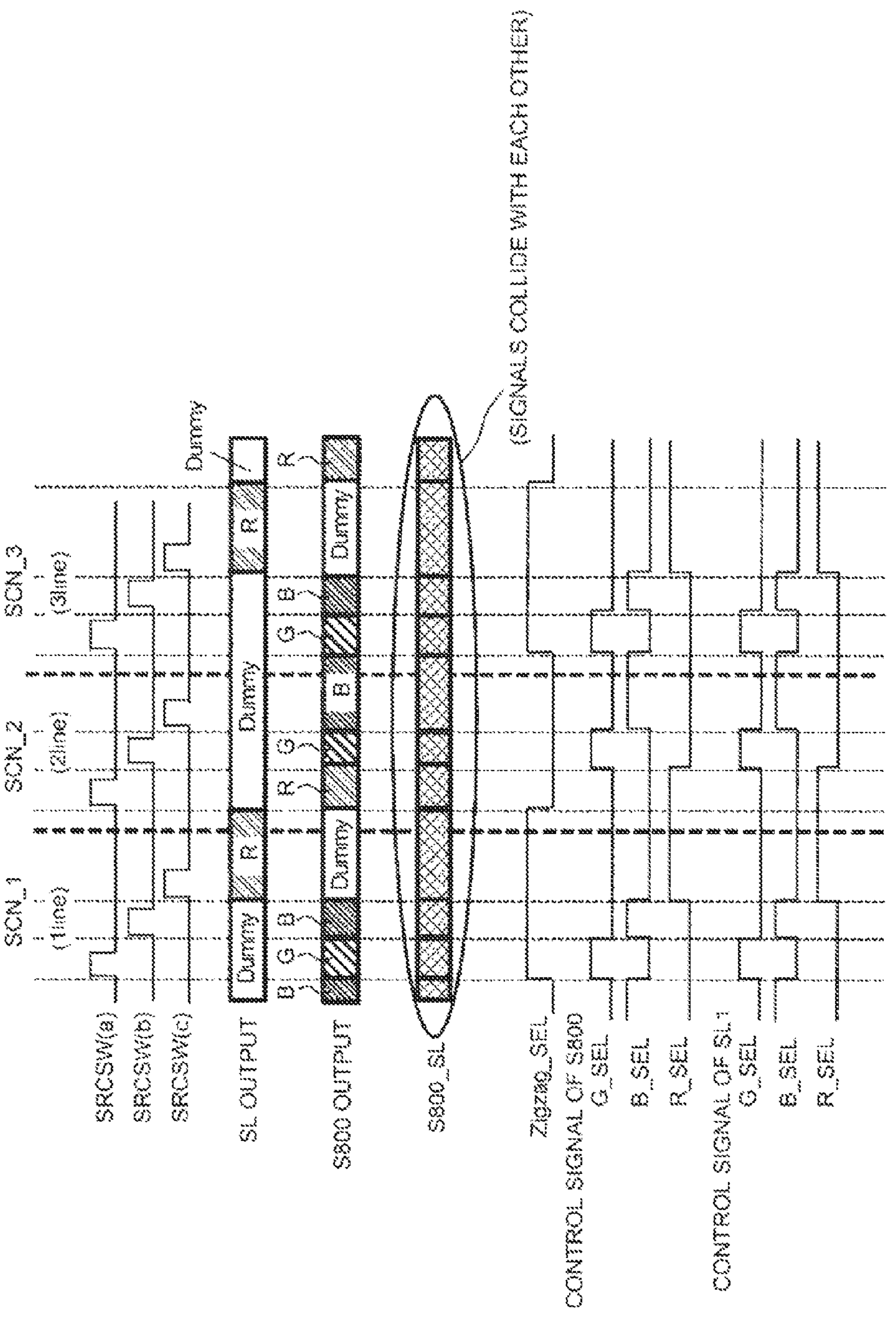
FIG. 3 is a timing diagram illustrating operations in case that dummy data is output in case that data of a sub-pixel to be originally displayed and driven is not present, as a comparative example of FIG. 2.
Figure 9:
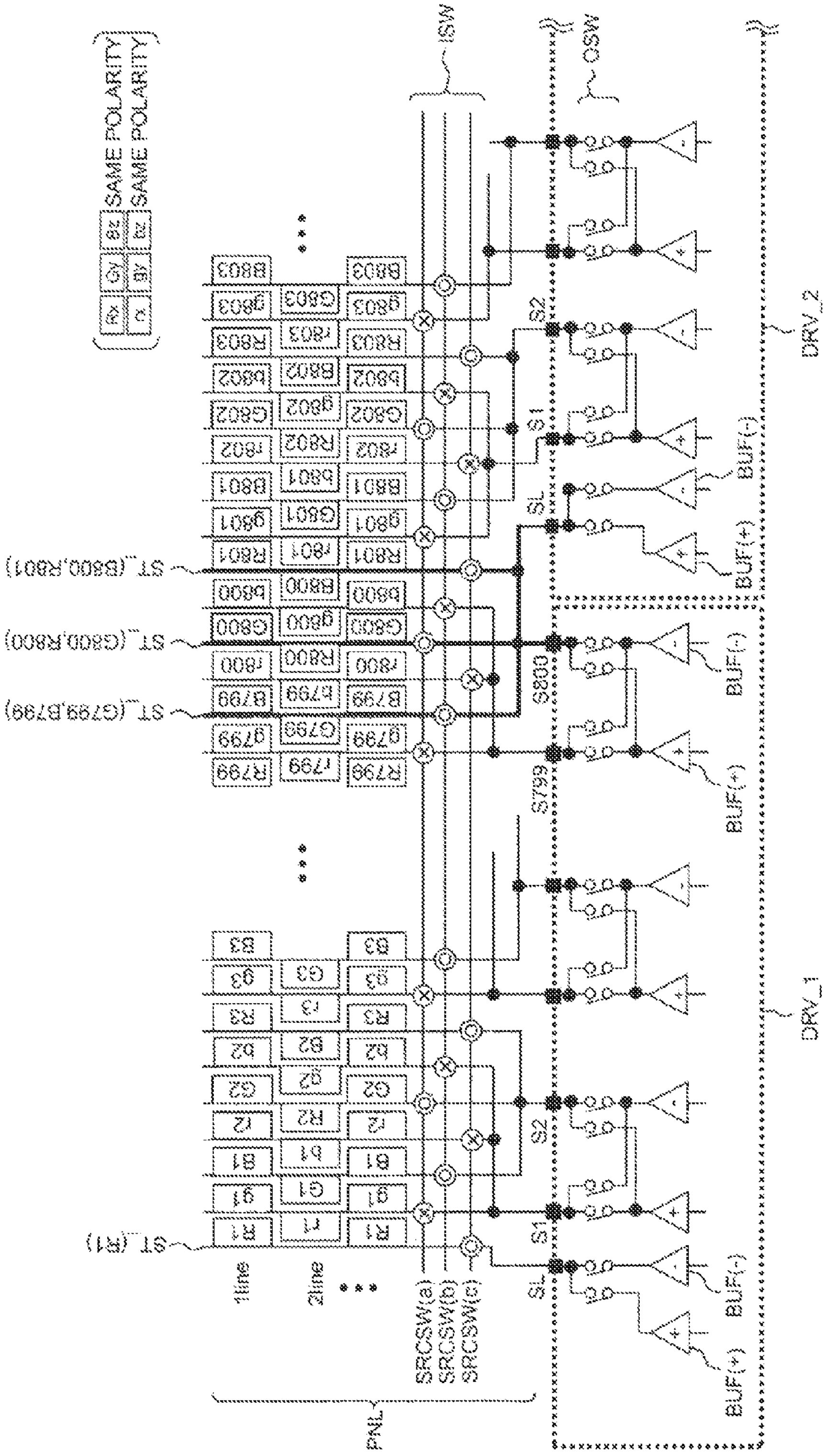
FIG. 9 is a diagram illustrating a configuration in which a terminal gradation signal output terminal of pre-stage display drivers arranged in parallel and an initial gradation signal output terminal of next-stage display drivers arranged in parallel are connected to common gradation signal electrodes in case that a plurality of display drivers are used in parallel.
Figure 10:
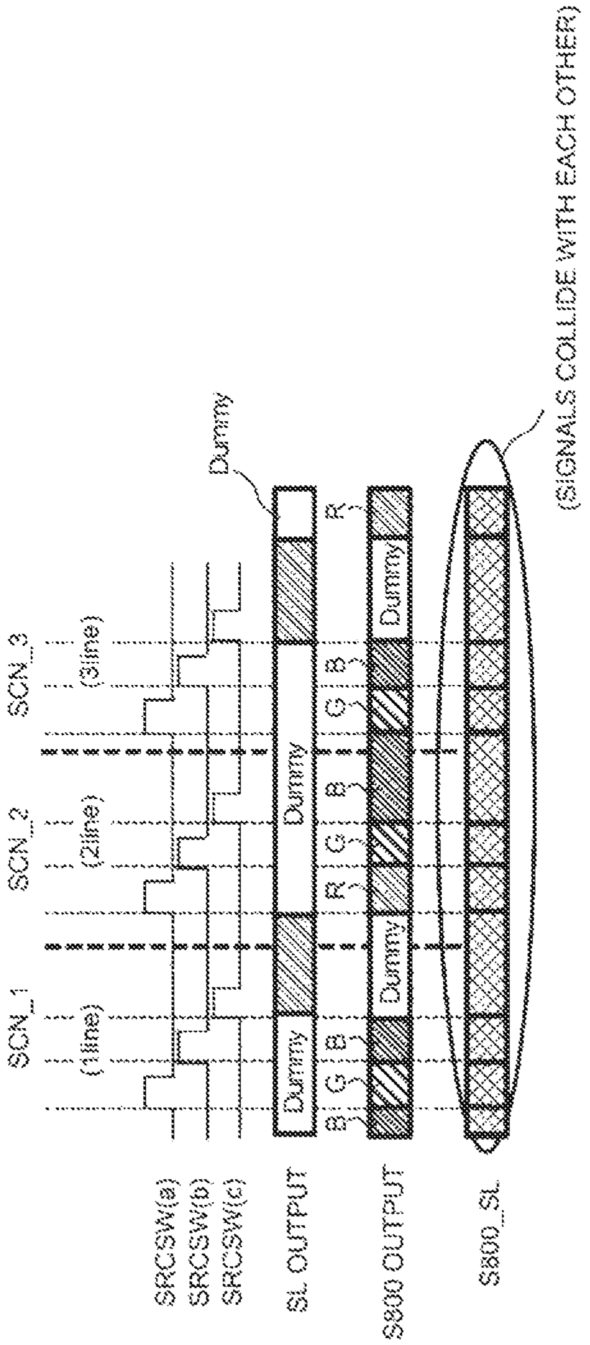
FIG. 10 is a diagram illustrating the competition of data which is output from the terminal gradation signal output terminal of the pre-stage display drivers with data which is output from the initial gradation signal output terminal of the next-stage display drivers in the configuration of FIG. 9.

As illustrated in FIG. 3, in case that a plurality of display drivers DRV_1 and DRV_2 are used in parallel, common gradation signal electrodes to be driven using display data from the terminal gradation signal output terminal S800 of the pre-stage display driver DRV_1 arranged in parallel and display data from the initial gradation signal output terminal SL of the next-stage display driver DRV_2 arranged in parallel are present. Specifically; a gradation signal electrode ST_(B800, R801) is to be driven using the display data of both the pre and post-stage display drivers DRV_1 and DRV_2 arranged in parallel. In case that this point is applied as it is, and the gradation signal electrode ST_(B800, R801) is connected, as in FIG. 9, to both the terminal gradation signal output terminal S800 of the pre-stage display driver DRV_1 arranged in parallel and the initial gradation signal output terminal SL of the next-stage display driver DRV_2 arranged in parallel, it has been found that a problem occurs in which the display data and the dummy data described in FIG. 8 collide with each other, and the displays of sub-pixels which are connected to the gradation signal electrodes ST_B800, R801), ST_(G800, R800), and ST_(G799, B799) are conspicuously disordered as illustrated in FIG. 10. In FIG. 10, S800-SL means a gradation signal electrode is connected to both the gradation signal output terminal S800 and the gradation signal output terminal SL.

The following techniques for eliminating such a display disorder are proposed.

Figure 11:
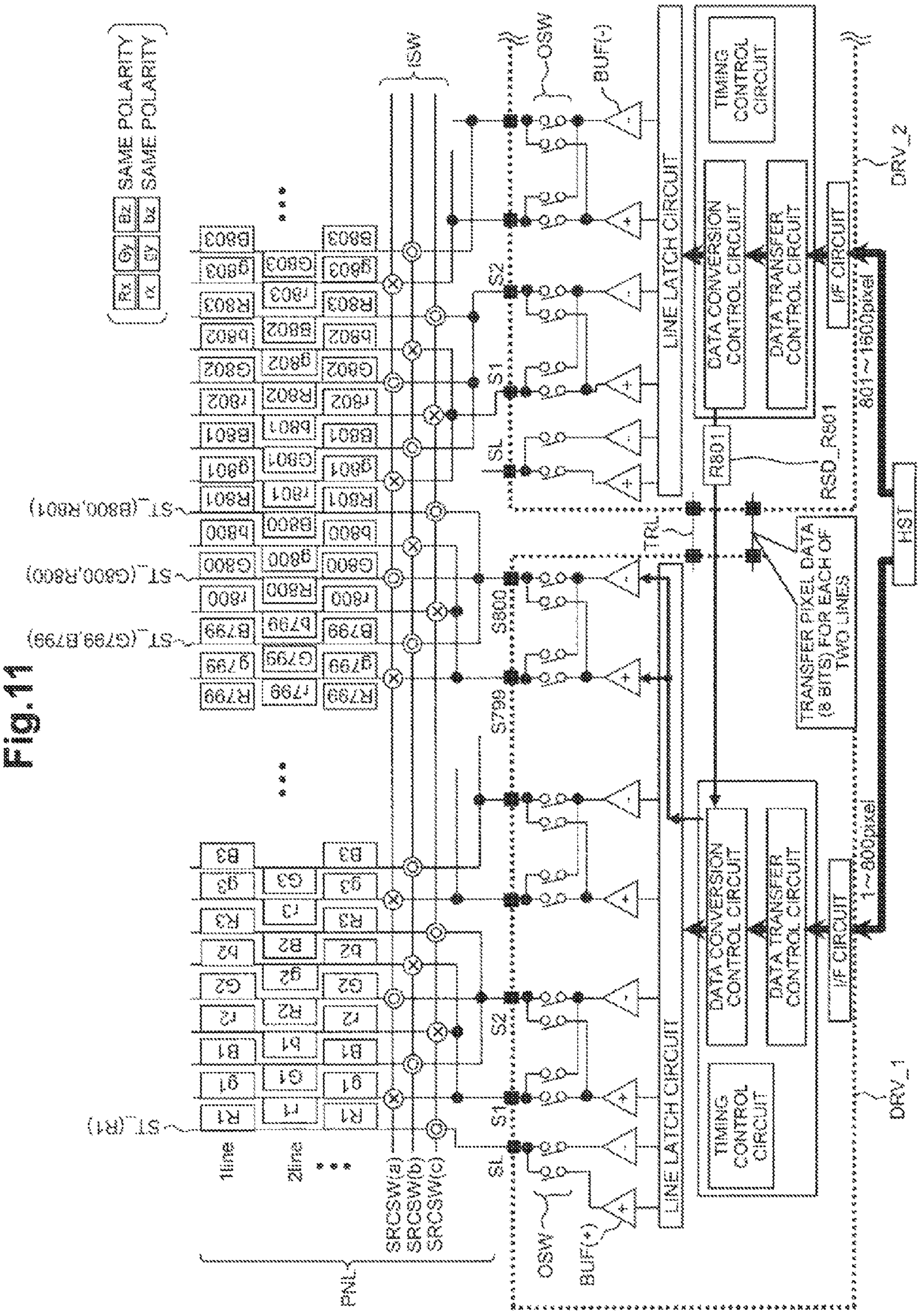
FIG. 11 is a diagram illustrating a configuration in which sub-pixel data having a concern of competition is transferred from the next-stage display driver to the pre-stage display driver, as a competition avoidance method of FIG. 10.

In a first embodiment illustrated in FIG. 11, the gradation signal electrode ST_(B800, R801) is connected to only the terminal gradation signal output terminal S800 of the pre-stage display driver DRV_1, and the initial gradation signal output terminal SL of the next-stage display driver DRV_2 arranged in parallel is set to be in a floating state. In this case, the pixel data SPD_R801 for driving the sub-pixel R801 is transferred from the next-stage display driver DRV_2 to the pre-stage display driver DRV_1 in synchronization with sequential drive of the scanning line. The pre-stage display driver DRV_1 uses the transferred pixel data SPD_R801 in driving the gradation signal electrode ST_(B800, R801).

However, in the method of FIG. 11, a transfer path TRL for transferring the pixel data SPD_R801 has to be provided between the display drivers. This transfer path TRL is required to be formed on a glass substrate in which the display drivers DRV_1 and DRV_2 are mounted, or to be formed on a flexible printed circuit (FPC) for connecting the display drivers DRV_1 and DRV_2 to a host device HST, has a tendency to he influenced by noise, and also has an increase in power consumption due to external transfer, which leads to a result of a deterioration in coping with high-resolution display.

Figure 12:
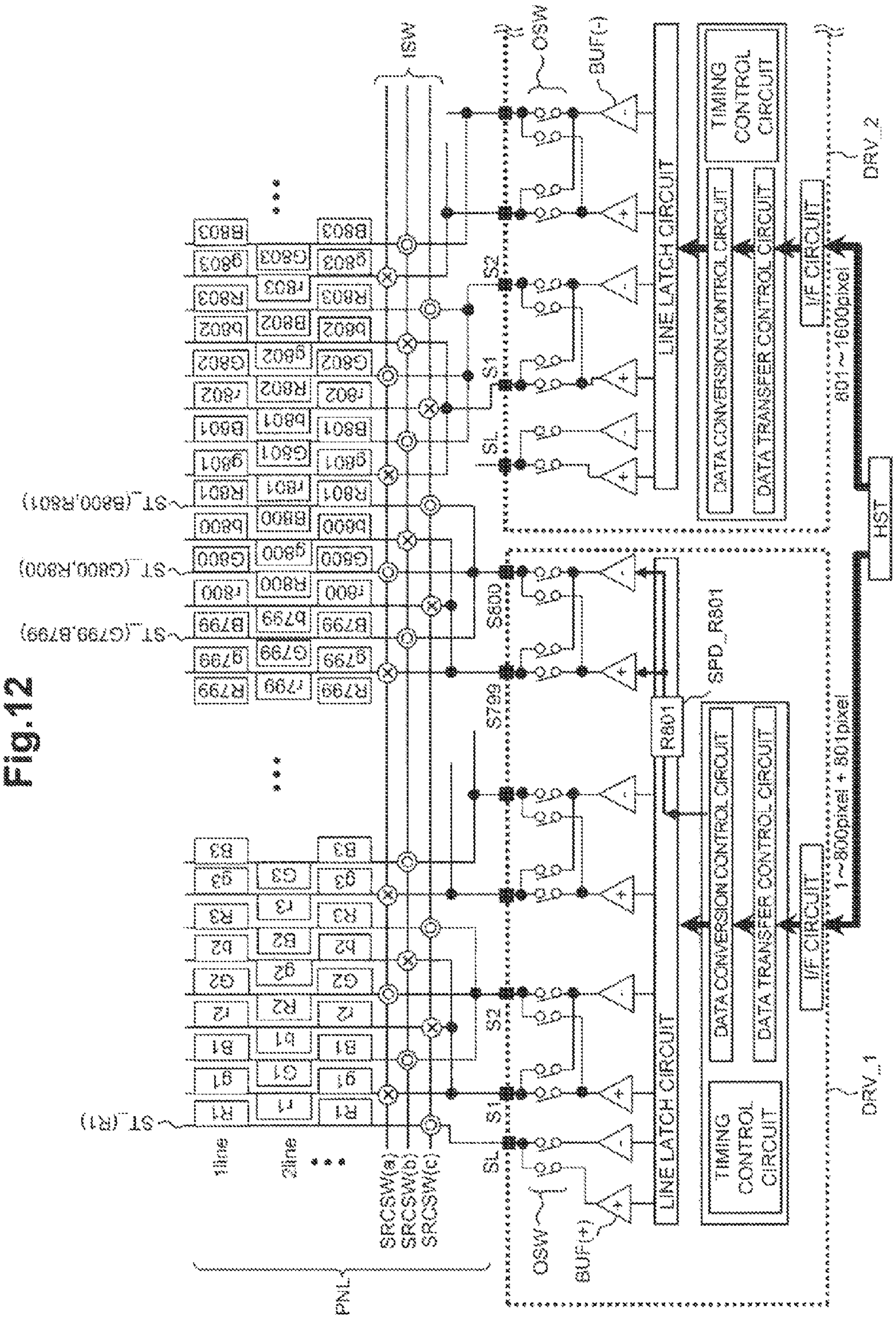
FIG. 12 is a diagram illustrating a configuration in which a host device gives the sub-pixel data having a concern of competition to the pre-stage display driver from the beginning, as the competition avoidance method of FIG. 10.

In a second embodiment, the transfer path of the pixel data SPD_R801 in the first method is not provided between the display drivers DRV_1 and DRV_2, and the pixel data is transferred from the host device HST directly to the display driver DRV_1 as illustrated in FIG. 12. The host device HST gives $1^{st}$ to $801^{st}$ sub-pixel data (1 to 800 pixels+801 pixels) to the pre-stage display driver DRV_1, and gives $801^{st}$ to $1600^{th}$ sub-pixel data (801 to 1600 pixels) to the next-stage display driver DRV_2.

However, the host device HST may originally give first-half $1^{st}$ to $800^{th}$ sub-pixel data to the pre-stage display driver DRV_1, and give second-half $801^{st}$ to $1600^{th}$ sub-pixel data to the next-stage display driver DRV_2. Consequently, the host device HST is burdened with a special process in which the second-half $801^{st}$ pixel data is added to the last end of the first-half data and is given to the pre-stage display driver DRV_1, and the correction of an image processing program of the host device HST or the development of a new image processing program is imposed.

An object of the invention is to provide an electronic apparatus which is capable of excluding undesired competition of data between display drivers for a specific gradation signal electrode without imposing a new burden on a host device and without requiring the transfer of sub-pixel data between the display drivers, in case that dot inversion drive in zigzag is performed on the display panel using a plurality of display drivers which are arranged in parallel.

The following is a brief description of the summary of the representative embodiments disclosed in the application.

That is, in case that a terminal gradation signal output terminal in a pre-stage display driver and an initial gradation signal output terminal in a next-stage display driver of a plurality of display drivers which are arranged in parallel are used in driving the same gradation signal electrode of a display panel, an output of dummy data from the other gradation signal output terminal which mutually competes with an output timing of a gradation signal from one gradation signal output terminal between both the gradation signal output terminals is suppressed by high impedance control of a corresponding gradation signal output terminal.

The following is a brief description of an effect obtained by the representative embodiments disclosed in the application.

That is, it is possible to exclude undesired competition of data between display drivers for a specific gradation signal electrode without imposing a new burden on a host device and without requiring the transfer of sub-pixel data between the display drivers, in case that dot inversion drive in zigzag is performed on the display panel using a plurality of display drivers which are arranged in parallel.

1. Summary of the Embodiments

First, summary of representative embodiments of the invention disclosed in the application will be described. Reference numerals in drawings in parentheses referred to in description of the summary of the representative embodiments just denote components included in the concept of the components to which the reference numerals are designated.

[1] High Impedance Control Replaced by Dummy Data Output

An electronic apparatus includes a display panel and a plurality of display drivers which are disposed in series at an edge of the display panel in order to drive the display panel. The display panel includes a plurality of sub-pixels in which selection terminals are connected to scanning signal electrodes and signal input terminals are connected to gradation signal electrodes, and is configured such that a plurality of scanning lines on which the sub-pixels are disposed in an extending direction of the scanning signal electrode and a plurality of signal lines on which the sub-pixels are disposed in an extending direction of the gradation signal electrode are formed in the display panel, and that the sub-pixels on the same signal line are alternately connected to the gradation signal electrodes on one side or the other side which are next to each other, sequentially for each predetermined number. The display drivers supply gradation signals to a plurality of gradation signal electrodes in a parallel manner while driving the scanning signal electrodes in a predetermined order. Both gradation signal output terminals which are next to each other between the display drivers next to each other in series are connected to a common gradation signal electrode to be driven. The display drivers next to each other in series suppress an output of dummy data from the gradation signal output terminals on the other side which are next to each other, competing with an output timing of gradation signals from the gradation signal output terminals on one side which are next to each other, by high impedance control relating to the gradation signal output terminals, as output control of a gradation signal directed to the common gradation signal electrode.

According to this, the output of the dummy data having concern for competition on the same gradation signal electrode of the display panel is suppressed by the high impedance control of the output. Therefore, in case that dot inversion drive in zigzag is performed on the display panel using a plurality of display drivers which are arranged in parallel, a new burden on the host device described in FIG. 12 is not imposed, and the transfer of sub-pixel data between the display drivers described in FIG. 11 is not also required, thereby allowing undesired competition of data between the display drivers for a specific gradation signal electrode to be excluded.

[2] Alternate Switching of Output Destination of Buffer Having Different Output Polarity in Output Switch Circuit In item 1, the display driver includes a plurality of first output buffers that output a gradation signal of a first polarity to the gradation signal output terminal and a plurality of second output buffers that output a gradation signal of a second polarity, and includes a output switch circuit that switchably connects art output of the first output buffer or the second output buffer to a corresponding gradation signal output terminal.

According to this, output destinations of the buffers having different output polarities are alternately switched in the output switch circuit, and thus it is possible to easily form a display driver that performs dot inversion drive in a zigzag on the display panel.

[3] Inversion of Drive Polarity in Units of Sub-pixel

In item 2, the predetermined number is 1. The display driver drives the gradation signal electrodes with the same polarity at an interval of one electrode using a plurality of the first output buffers and the second output buffers, and alternately switches drive polarities of the gradation signal electrodes in units of display frames.

According to this, it is possible to easily realize a Configuration in which a drive polarity is inverted in units of sub-pixels.

[4] Use of Amorphous Silicon in Semiconductor Constituting Active Element

In item 3, the display panel includes an active element constituted by a thin film transistor for each of the sub-pixels. Amorphous silicon is used in a semiconductor constituting the active element, and the gradation signal output terminals correspond to the gradation signal electrodes one to one.

According to this, although being suitable for using a low-cost display panel, the display driver includes gradation signal output terminals having a number corresponding to the number of gradation signal electrodes.

[5] Use of Low-temperature Polysilicon in Semiconductor Constituting Active Element In item 3, the display panel includes an active element constituted by a thin film transistor for each of the sub-pixels, and low-temperature polysilicon is used in a semiconductor constituting the active element. One of the gradation signal output terminals is allocated for each of three gradation signal electrodes of R, G, and B driven with the same polarity at an interval of one electrode with an input switch circuit interposed therebetween. The display driver switches a gradation signal electrode which is connected to a gradation signal output terminal in the input switch circuit in synchronization with switching of a driven scanning signal electrode.

According to this, it is suitable to use a display panel Capable of bringing an active element into high-speed operation. Therefore, even in case that the input switch circuit is interposed in the input path of the sub-pixel, a required operating speed is guaranteed, and the display driver may have fewer gradation signal output terminals than gradation signal electrodes.

[6] Selection of Slew Rate

In item 2, the first output buffer and the second output buffer which are capable of being connected to the gradation signal output terminals which are next to each other between the display drivers next to each other in series are configured such that a slew rate of a gradation signal is capable of being selected in accordance with a selection signal.

According to this, the pre-stage and next-stage gradation signal output terminals are connected in common to a gradation signal electrode which each takes charge of, and thus, it is possible to cope with a case where the drive loads of the first and second output buffers increase.

[7] Division, of a Series of Gradation Data for Each Scanning Line and Supply of Divided Data to Each Display Driver In item 2, the plurality of display drivers provide the same circuit configuration. A host device that supplies display data to the plurality of display drivers is further included. The host device divides a series of gradation data for each scanning line and supplies the divided data to each display driver.

According to this, in case that dot inversion drive in a zigzag is performed on the display panel using a plurality of display drivers which are arranged in parallel, the host device does not impose a new burden in that, gradation data is supplied to each display driver.

[8] High Impedance Control instead of Dummy Data Output

The display driver includes a plurality of gradation signal output terminals, arranged in parallel, which output gradation signals in a parallel manner, a plurality of first output buffers that output a gradation signal of a first polarity to the gradation signal output terminals, a plurality of second output buffers that output a gradation signal of a second polarity to the gradation signal output terminals, an output switch circuit that switchably connects outputs of the plurality of first output buffers and second output buffers to corresponding gradation signal output terminals, and a timing control circuit that controls an output of a gradation signal to a corresponding gradation signal output terminal from each of the first output buffers and the second output buffers in synchronization with a display timing while alternately switching a switch state of the output switch circuit at a predetermined timing. The outputs of the first output buffers and the second output buffers which are capable of being connected to the gradation signal output terminals located on both ends within the gradation signal output terminals arranged in parallel through the output switch circuit are capable of being selectively controlled in a high impedance state. The timing control circuit controls the outputs in a high impedance state in accordance with a dummy data output timing of the first output buffers or the second output buffers which are capable of being connected to the gradation signal output terminals located on both ends within the gradation signal output terminals through the output switch circuit.

According to this, the output is controlled at high impedance in accordance with an output timing of dummy data having concern for competition on the same gradation signal electrode of the display panel, and thus the output of the dummy data is suppressed. Therefore, in case that dot inversion drive in a zigzag is performed on the display panel using a plurality of display drivers which are arranged in parallel, the display driver is suitable for excluding undesired competition of data between other display drivers for a specific gradation signal electrode without imposing a new burden on the host device described in FIG. 12 and without requiring the transfer of sub-pixel data between the display drivers described in FIG. 11.

[9] Inversion of Drive Polarity of Sub-Pixel Synchronized with Switching of Display Frame In item 8, the predetermined timing is a timing which is synchronized with switching of a display frame.

According to this, it is possible to easily perform the inversion of the drive polarity of a sub-pixel in units of display frames.

[10] Selection of Slew Rate

In item 8, the first output buffer and the second output buffer which are capable of being connected to the gradation signal output terminals which are next to each other between the display drivers next to each other in series are configured such that a slew rate of a gradation signal is capable of being selected in accordance with a selection signal.

According to this, the pre-stage and next-stage gradation signal output terminals axe connected in common to a gradation signal electrode which each takes charge of, and thus it is possible to cope with a case where the drive loads of the first and second output buffers increase.

[11] High Impedance Control for Suppressing Dummy Data Output

The display driver includes a plurality of gradation signal output terminals arranged in parallel, which output gradation signals in a parallel manner, a plurality of first output buffers that output a gradation signal of a first polarity to the gradation signal output terminals, a plurality of second output buffers that output a gradation signal of a second polarity to the gradation signal output terminals, an output switch circuit that switchably connects outputs of the plurality of first output buffers and second output buffers to corresponding gradation signal output terminals, and a timing control circuit that controls an output of a gradation signal to a corresponding gradation signal output terminal from each of the first output buffers and the second output buffers in synchronization with a display timing while alternately switching a switch state of the output switch circuit at a predetermined timing, and is formed in one semiconductor substrate. The outputs of the first output buffers and the second output buffers which are capable of being connected to the gradation signal output terminals located on both ends within the gradation signal output terminals arranged in parallel through the output switch circuit are capable of being selectively controlled in a high impedance state. The timing control circuit suppresses an output of dummy data from the first output buffers and the second output buffers which are capable of being connected to the gradation signal output terminals located on both ends within the gradation signal output terminals through the switch circuit, by high impedance control of the first output buffers and the second output buffers.

According to this, the output of the dummy data having concern for competition on the same gradation signal electrode of the display panel is suppressed by the high impedance control of the output. Therefore, in case that dot inversion drive in a zigzag is performed on the display panel using a plurality of display drivers which are arranged in parallel, the display driver is suitable for excluding undesired competition of data between other display drivers for a specific gradation signal electrode without imposing a new burden on the host device described in FIG. 12 and without requiring the transfer of sub-pixel data between the display drivers described in FIG. 11.

2. Further Detailed Description of the Embodiments

The embodiments will be described in detail.

Figure 1:
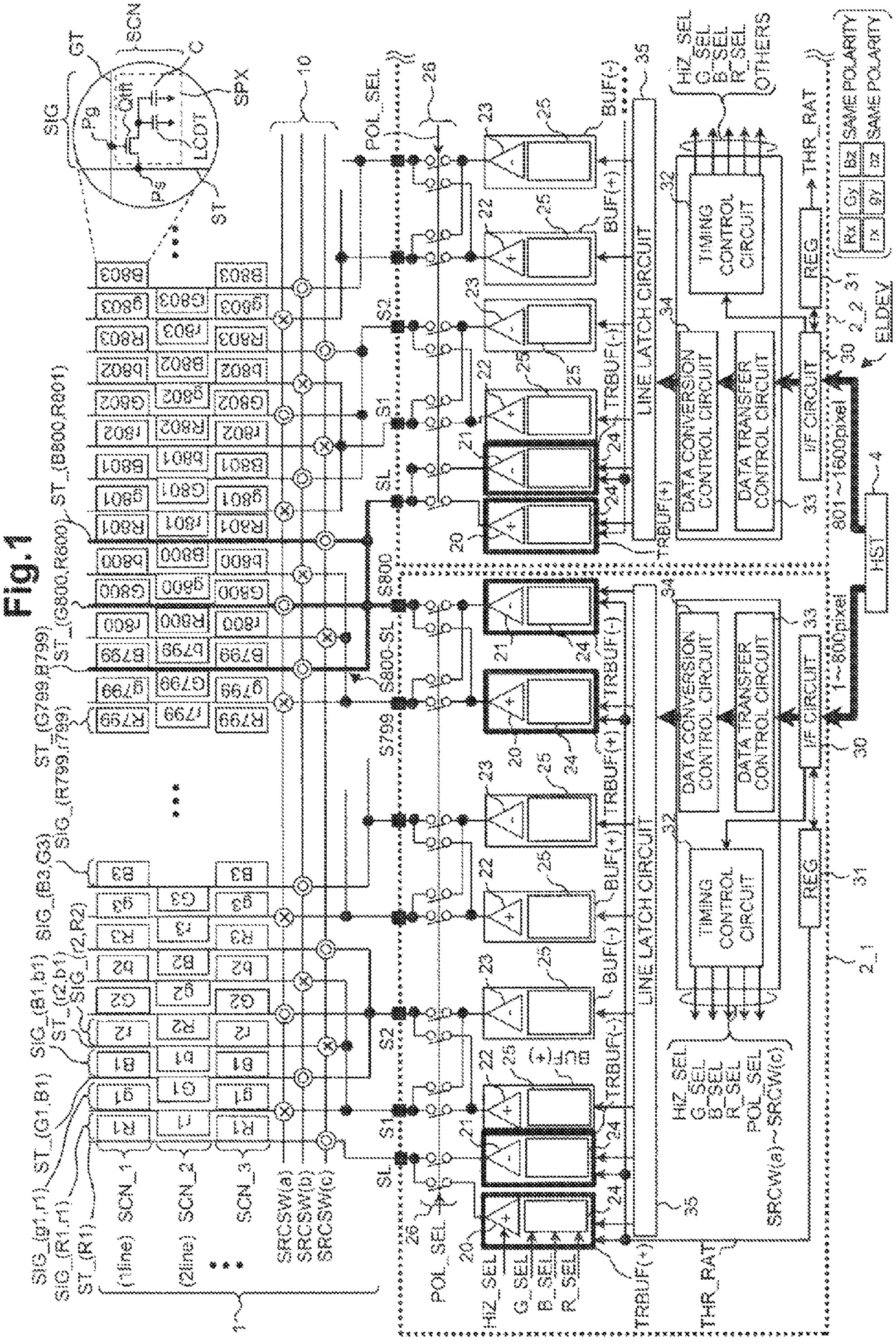
FIG. 1 is a block diagram illustrating an example of an electronic apparatus using a display panel on which dot inversion drive in zigzag is performed and a plurality of display drivers that drive the panel.

FIG. 1 illustrates an example of an electronic apparatus using a display panel on which dot inversion drive in a zigzag is performed and a plurality of display drivers that drive the panel. An electronic apparatus ELDEV shown in this drawing is not particularly limited, but may be a personal computer, a tablet, a phablet, a cellular phone, or the like.

The electronic apparatus ELDEV includes a display panel 1 and two display drivers 2_1 and 2_2 which are disposed in series at the edge thereof in order to drive the display panel 1.

In the display panel 1, Rx, Gx, Bx, rx, gx, and bx (x is a pixel number) indicate sub-pixels of red (R, r), green (G, g), and blue (B, b). One group of the sub-pixels of red, green, and blue which are driven with the same polarity is indicated by Rx, Gx, and Bx, and the other group is indicated by rx, gx, and bx.

The details of a sub-pixel SPX are illustrated in a display panel B803. The sub-pixel SPX is configured such that a selection terminal Pg which is the gate electrode of a thin film transistor as an active element is connected to a scanning signal electrode GT, a signal input terminal Ps which is the source of a thin film transistor Qtft is connected to a gradation signal electrode ST, a liquid crystal display element LCDT and a charge storage capacitor C are connected to the drain electrode of the thin film transistor Qtft, and that the liquid crystal display element LCDT and the charge storage capacitor C are connected to a common electrode. SCN means a scanning line in which the sub-pixel SPX is disposed in the extending direction of the scanning signal electrode GT, and SCN_1, SCN_2, and SCN_3 axe representatively illustrated in FIG. 1. SIG means a signal line in which a sub-pixel is disposed in the extending direction of the gradation signal electrode ST, and ST_(R1), ST_(g1, r1), ST_(G1, B1), . . . are representatively illustrated in FIG. 1.

In the arrangement of a plurality of sub-pixels SPX in a matrix, in consideration of zigzag dot inversion drive, the sub-pixels SPX on the same signal line SIG are alternately Connected to the gradation signal electrodes ST on one side or the other side which are next to each other, sequentially for each sub-pixel. For example, the sub-pixels g1, G1, g1, . . . on the signal line SIG_(g1, G1) are alternately connected to the gradation signal electrodes ST_(g1, r1) on one side or the gradation signal electrodes ST_(G1, B1) on the other side which are next to each other, sequentially for each sub-pixel.

Here, the number of gradation signal electrodes ST formed is $3\times800+3\times800+1=4801$, and these electrodes are connected to two display drivers 2_1 and 2_2 having the same configuration through an input switch circuit 10. Each of the display drivers 2_1 and 2_2 includes gradation signal output terminals SL and S1 to S800. In each of the display drivers 2_1 and 2_2, each of the gradation signal output terminals S1 to S800 is connected to each of three gradation signal electrodes ST, driven with the same polarity at the interval of one electrode, through the input switch circuit 10. The input switch circuit 10 sequentially changes over switches which are set to he in an on-state in a title-division manner for each scanning line by three switch signals SRCSW(a) to SRCSW(c). Particularly, the gradation signal output terminal SL of the pre-stage display driver 2_1 is singly connected to a leading gradation signal electrode ST_(RF1), but the gradation signal output terminal SL of the post-stage display driver 2_2 is connected to the terminal gradation signal output terminal S800 of the pre-stage display driver 2_1.

The display driver 2_1 supplies gradation signals to a plurality of gradation signal electrodes ST in a parallel manner while driving the scanning signal electrodes SCN in a predetermined order. The display drivers 2_1 and 2_2 are provided with first output buffers TRBUF(+) and BUF(+) that output a positive-polarity gradation signal and second output buffers TRBUF(−) and BUF (−) that output a negative-polarity gradation signal to the gradation signal output terminals SL and S1 to S800 through an output switch circuit 26. The output of the first output buffer TRBUF(+) or the second output buffer TRBUF(−) is connected to the gradation signal output terminal SL so as to be alternately switched by the output switch circuit 36 for each display frame. The output of the first output buffer TRBUF(+) or the second output buffer TRBUF(−) is connected to the gradation signal output terminals S799 and S800 so as to be alternately switched by the output switch circuit 26 for each display frame. The output of the first output buffer BUF(+) or the second output buffer BUF(−) is connected to other gradation signal output terminals Si and Si+1 which are next to each other so as to be alternately switched by the output switch circuit 26 for each display frame. The control of the output switch circuit 26 is performed using a polarity switching signal POL_SEL. In case that the polarity switching signal POL_SEL is set to be at a first level, the gradation output terminal SL is connected to the output buffer TRBUF (+), the odd-numbered gradation output terminals S1, S3, . . . , and S797 are connected to the output buffer BUF(−), the even-numbered gradation output terminals S2, S4, . . . , and S798 are connected to the output buffer BUF(+), the gradation output terminal S799 is connected to the output buffer TRBUF(−), and the gradation output terminal S800 is connected to the output buffer TRBUF(+). In case that the polarity switching signal POL_SEL is set to be at a second level, the connection states thereof are set to be reverse to the above.

The first output buffer TRBUF(+) includes an analog output circuit 20 with a high output impedance control function and a drive data latch 24 that inputs drive data, which is supplied to the analog output circuit 20, from a line latch circuit 35. The second output buffer TRBUF(−) includes an analog output circuit 21 with a high output impedance control function and the drive data latch 24 that inputs drive data, which is supplied to the analog output circuit 21, from the line latch circuit 35. The first output buffer BUF(+) includes an analog output circuit 22 and a drive data latch 25 that inputs drive data, which is supplied to the analog output circuit 22, from the line latch circuit 35. The second output buffer BUF(−) includes an analog output circuit 23 and the drive data latch 25 that inputs drive data, which is supplied to the analog output circuit 23, from the line latch circuit 35.

The difference between the analog output circuits 20 and 21 and the analog output circuits 22 and 23 is whether high output impedance control is performed. The high impedance state of the analog output circuits 20 and 21 is selected by a control signal HiZ_SEL. Latch data of the drive data latches 24 and 25 is selected by control signals G_SEL, B_SEL, and R_SEL. The signal G_SEL controls latch of green sub-pixel data, the signal B_SEL controls latch of blue sub-pixel data, and the signal R_SEL controls latch of red sub-pixel data. Although not particularly limited, these control signals G_SEL, B_SEL, and R_SEL are individually supplied to each of the drive data latches 24 and 25. Each of the control signals G_SEL, B_SEL, R_SEL, and HiZ_SEL is generated by a timing control circuit 32 being synchronized with a display timing.

Further, the slew rate of the first and second output buffers TRBUF(+) and TRBUF(−) can be selectively set in accordance with control data THR_RAT. For example, the size of an output stage transistor in the analog output circuits 20 and 21 is made selectable, or the bias current of a drive amplifier in the analog output circuits 20 and 21 is made selectable, thereby allowing the slew rate to be available. The control data THR_RAT is determined in accordance with data which is set in a register circuit (REG) 31 from a host device 4 through an interface circuit (I/F circuit) 30.

Display data is supplied from the host device 4 through the interface circuit 30 to a data transfer control circuit 33. The supplied display data may be temporarily stored in a frame buffer which is not shown, and the temporary storage thereof in the frame buffer may be omitted in case that the data is supplied sequentially in series as a data stream. The data transfer control circuit 33 supplies the supplied image data to a data conversion control circuit 34 in time for a display timing, and the data conversion control circuit 34 causes the line latch circuit 35 to latch drive data in units of scanning lines in accordance with the array of the sub-pixels SPX of the display panel 1. The drive data which is latched by the line latch circuit 35 is synchronized with time-division input selection by the switch signals SRCSW(a) to SRCSW(c) in one scanning line, and drive data of a corresponding color is latched by the drive data latches 24 and 25 on the basis of the selection signals G_SEL, B_SEL, and R_SEL.

Here, display operations will be described focusing on the gradation signal output terminals S1 and S2. In case that the polarity switching signal POL_SEL is set to be at a first level, the gradation output terminal S1 is connected to the output buffer BUF(−), and the gradation output terminal S2 is connected to the output buffer BUF(+). In a horizontal display period of the first scanning line SCN_1, sub-pixel data g1 is output from the gradation signal output terminal S1 in synchronization with input selection by the switch signal SRCSW(a) and sub-pixel data G2 is output from the gradation signal output terminal S2, sub-pixel data b2 is output from the gradation signal output terminal S1 in synchronization with input selection by the switch signal SRCSW(b) and sub-pixel data B1 is output from the gradation signal output terminal S2, and sub-pixel data r2 is output from the gradation signal output terminal S1 in synchronization with input selection by the switch signal SRCSW(c) and sub-pixel data R3 is output from the gradation signal output terminal S2.

Here, in case that two display drivers 2_1 and 2_2 which are the same as each other are brought into parallel operation and a display operation is performed, common gradation signal electrodes ST_(G799, B799), ST_(G800, R800), and ST_(B800, R801) to be driven using display data from the terminal gradation signal output terminal S800 of the pre-stage display driver 2_1 arranged in parallel and display data from the initial gradation signal output terminal SL of the next-stage display driver 2_2 arranged in parallel are present. In this configuration, in order to avoid the collision of an output from the gradation signal output terminal S800 in the pre-stage display driver 2_1 with an output from the gradation signal output terminal SL in the next-stage display driver 2_2, the outputs of the output buffers 20 and 21 which are connected to the gradation signal output terminals S800 and SL are controlled at high impedance in a period in which each of the gradation signal output terminals S800 and SL does not output a gradation signal of a display color.

Figure 2:
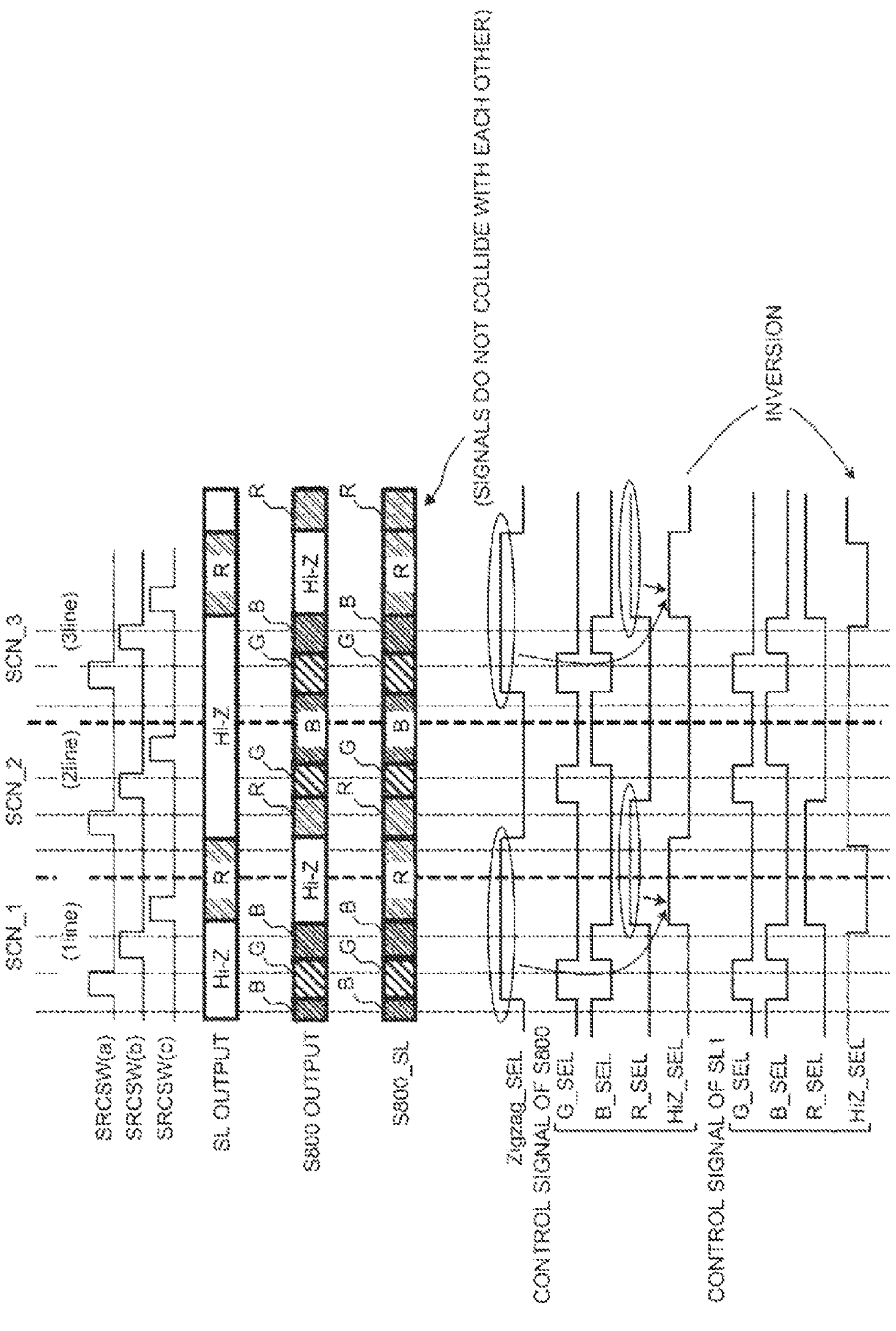
FIG. 2 is a timing diagram illustrating high impedance control operations for outputs of output buffers which are connected to gradation signal output terminals S800 and SL of FIG. 1.

FIG. 2 illustrates control timings of high impedance for the outputs of the output buffers 20 and 21 which are connected to the gradation signal output terminals S800 and SL. Zigzag_SEL is a state signal which is toggled for each switching of the drive scanning line SCN, and is generated in the timing control circuit 32. The switching of the scanning line SCN is performed for each horizontal display period within a display frame period.

The timing control circuit 32 generates the selection signals G_SEL, B_SEL, R_SEL, and HiZ_SEL in accordance with a logic which is set in advance. Although not particularly limited, the selection signal G_SEL for selecting green data is set to he at a high level in accordance with the high pulse period of the switch signal SRCSW(a), the selection signal B_SEL for selecting blue data is set to be at a high level in accordance with the high pulse period of the switch signal SRCSW(b), and the selection signal R_SEL for selecting an output of red data is set to be at a high level in accordance with a period until the high pulse Of the switch signal SRCSW(a) is next changed from the high pulse of the switch signal SRCSW(c). Regarding the output buffers BUF(+) and BUF(−) which are connected to the gradation signal output terminals S1 to S798, drive data of a corresponding color is latched by a corresponding data latch as in accordance with the high level waveform of each of the selection signals G_SEL, B_SEL, and R_SEL to thereby output a gradation signal from the gradation signal output terminal. On the other hand, the output buffers TRBUF(+) and TRBUF(−) which are connected to the gradation signal output terminals SL and S800 scheduled for common connection are targeted for high impedance control based on the control signal HiZ_SEL. As illustrated in FIG. 2, the control signal HiZ_SEL for the output buffers TRBUF (+) and TRBUF(−) which are connected to the gradation signal output terminal S800 becomes a logical product signal of the state signal Zigzag_SEL and the selection signal R_SEL, and the outputs of the output buffers TRBUF (+) and TRBUF(−) are set to have high impedance by the high level of the signal HiZ_SEL. This is because the gradation output terminal S800 is not required to output a red gradation signal to the gradation signal electrode ST_(B800, R801) in the high pulse period of the switch signal SRCSW(c). In this period, the next-stage gradation signal output terminal SL outputs the red gradation signal. Therefore, the output buffers TRBUF(+) and TRBUF(−) which are connected to the next-stage gradation signal output terminal SL are configured such that an inversion signal of the control signal HiZ_SEL to the output buffers TRBUF(+) and TRBUF(−) which are connected to the gradation signal output terminal S800 is supplied as the control signal HiZ_SEL.

In case that selective high impedance control for the outputs of the output buffers TRBUF(+) and TRBUF(−) is not adopted, and dummy data (Dummy) is output in case that data of a sub-pixel which are originally to be displayed and driven is not present as illustrated in FIG. 3, dummy data and a gradation signal of a sub-pixel which are output from one of the pre-stage gradation signal output terminal S800 and the post-stage gradation signal output terminal SL collide with each other, and thus display is disordered.

As shown in FIG. 2, the outputs of the output buffers TRBUF(+) and TRBUF(−) which are respectively connected to the pre-stage gradation signal output terminal S800 and the next-stage gradation signal output terminal SL are controlled at high impedance, as in FIG. 2, in a period in which there is a concern of competition on the same gradation signal electrode ST_(B800, R801) of the display panel 1. Therefore, in case that dot inversion drive in zigzag is performed on the display panel using a plurality of display drivers which are arranged in parallel, a new burden on the host device described in FIG. 12 is not imposed, and the transfer of sub-pixel data between the display drivers described in FIG. 11 is not also required, thereby allowing undesired competition of data between the display drivers for a specific gradation signal electrode to be excluded.

As described above, the output buffers TRBUF(+) and TRBUF(−) which are capable of being connected to the gradation signal output terminals S800 and SL next to each other between the display drivers next to each other in series are configured such that the slew rate of a gradation signal is capable of being selected in accordance with the selection signal THR_RAT. According to this, the pre-stage and next-stage gradation signal output terminals S800 and SL are connected in common to a gradation signal electrode which each takes charge of, and thus, it is possible to cope with a case where the drive loads of the first and second output buffer increase.

The display panel 1 illustrated in FIG. 1 includes the active element Qtft constituted by a thin film transistor for each sub-pixel SPX, and low-temperature polysilicon is used in a semiconductor constituting the active element Qtft. One gradation signal output terminal is allocated for each of three gradation signal electrodes of R, G, and B driven with the same polarity at the interval of one electrode with the input switch circuit 10 interposed therebetween, and one gradation signal electrode selected by the switch signals SRCSW(a) to SRCSW(c) is connected to the common gradation signal output terminal from within the three gradation signal electrodes. According to this, it is suitable to use the display panel 1 capable of bringing an active element into high-speed operation. Therefore, even in case that the input switch circuit 10 is interposed in the input path of the sub-pixel, a required operating speed is guaranteed. The display drivers 2_1 and 2_2 may have fewer gradation signal output terminals than the number of gradation signal electrodes, and the coping with the high-resolution display of the display drivers 2_1 and 2_2 is facilitated.

Figure 4:
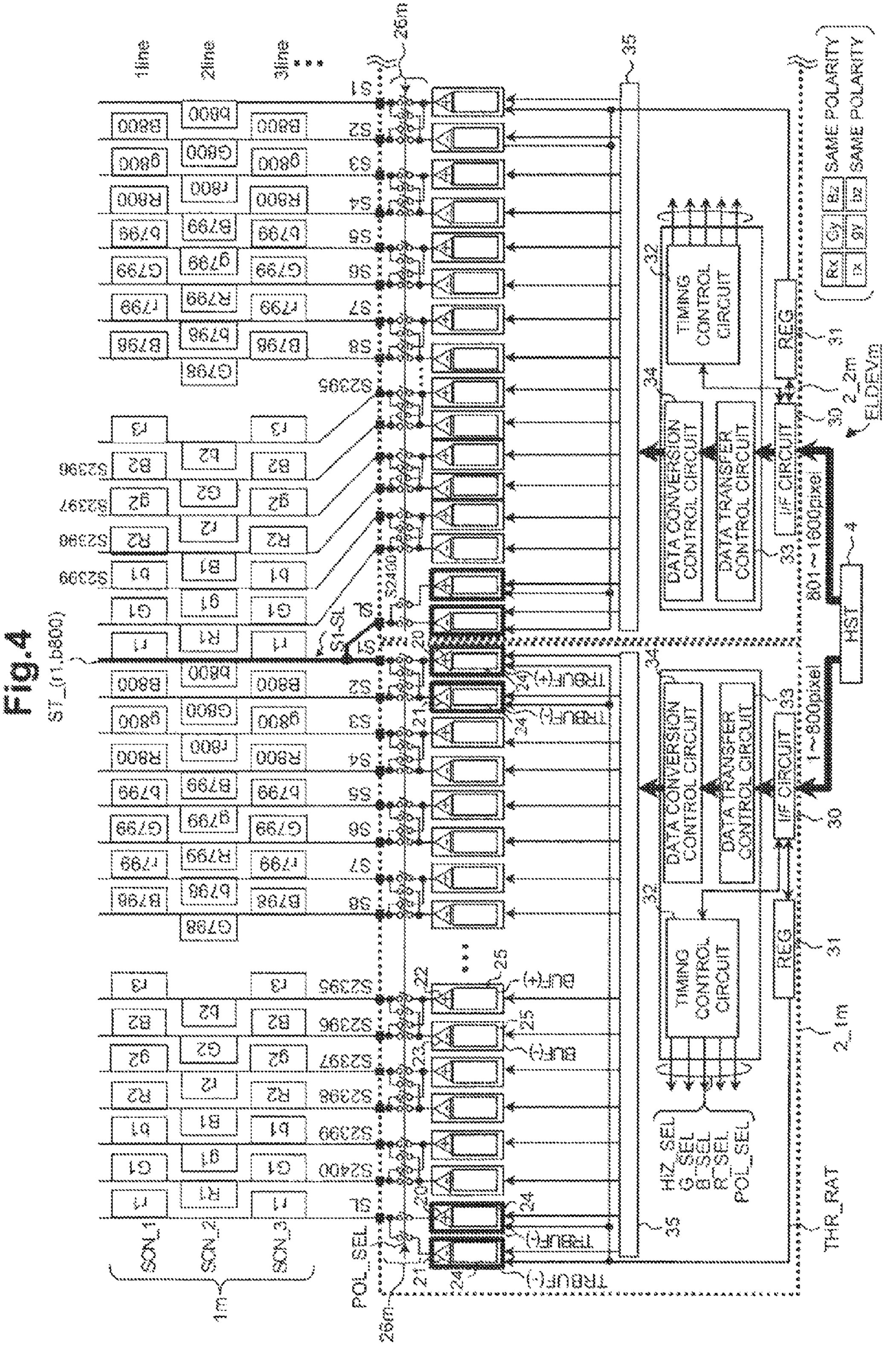
FIG. 4 is a block diagram illustrating an electronic apparatus in which a display panel using amorphous silicon is applied to a semiconductor constituting an active element.

FIG. 4 illustrates an electronic apparatus ELDEVm to which a display panel 1*m* using amorphous silicon in a semiconductor constituting an active element is applied. The electronic apparatus ELDEVm illustrated in FIG. 4 is different from the electronic apparatus ELDEV of FIG. 1, in that the display panel 1*m* uses an active element constituted by a thin film transistor for each sub-pixel, but amorphous silicon is used in a semiconductor constituting an active element, and the gradation signal output terminals correspond to the gradation signal electrode one to one. Accordingly, the number of gradation signal output terminals becomes three times that in FIG. 1, and thus the magnitude of an output switch circuit 26*m* and the number of output buffers BUF(+) and BUF(−) also become approximately three times those in FIG. 1. The initial-stage output buffers and the final-stage output buffers TRBUF(+) and TRBUF(−) of display drivers 2_1*m* and 2_2*m* are the same as those in FIG. 1, in that high output impedance control can be performed and a slew rate can be adjusted. Since other configurations are the same as those in FIG. 1, the same reference numerals and signs as the above are attached, and thus the detailed description thereof will not be given.

Figure 5:
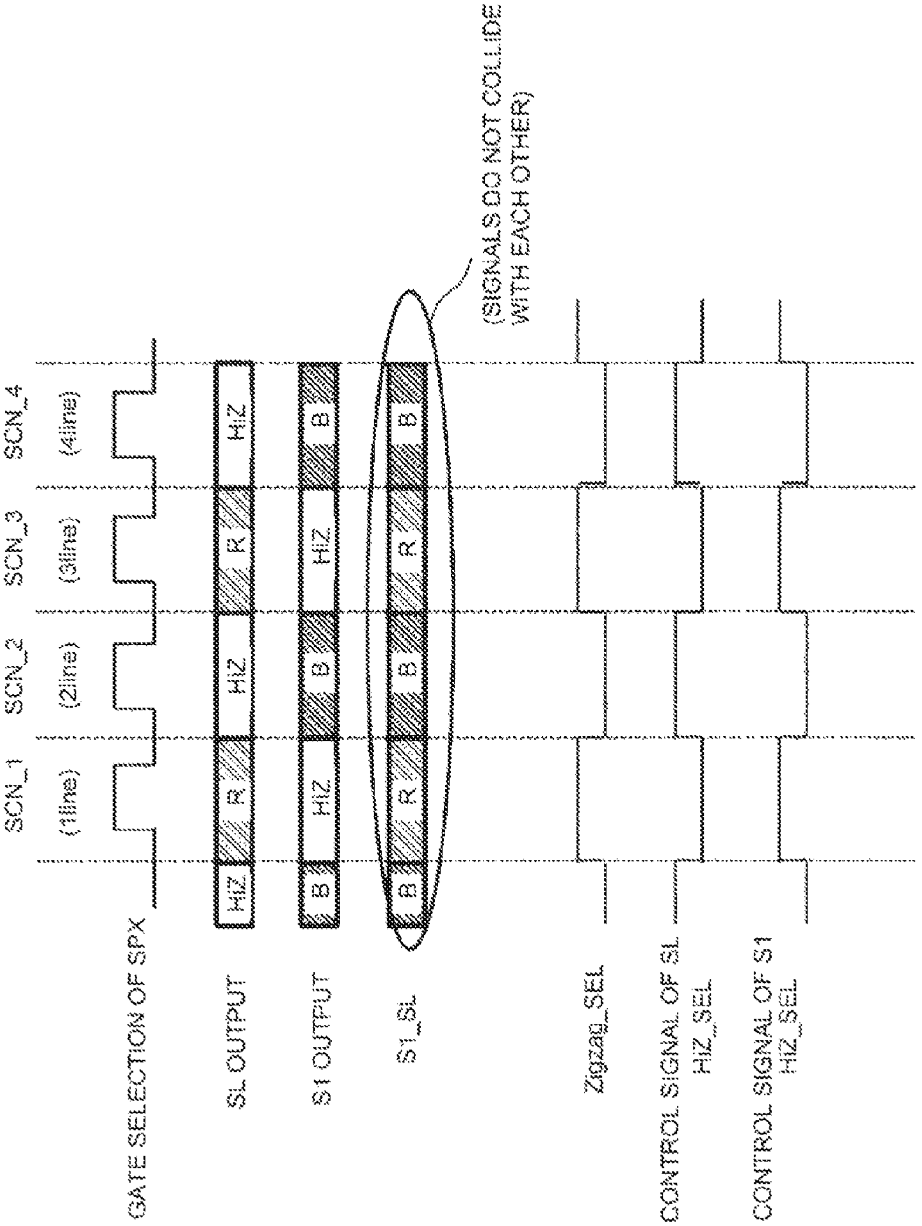
FIG. 5 is a timing diagram illustrating high impedance control operations for outputs of output buffers which are connected to gradation signal output terminals S1 and SL of FIG. 4.
Figure 6:
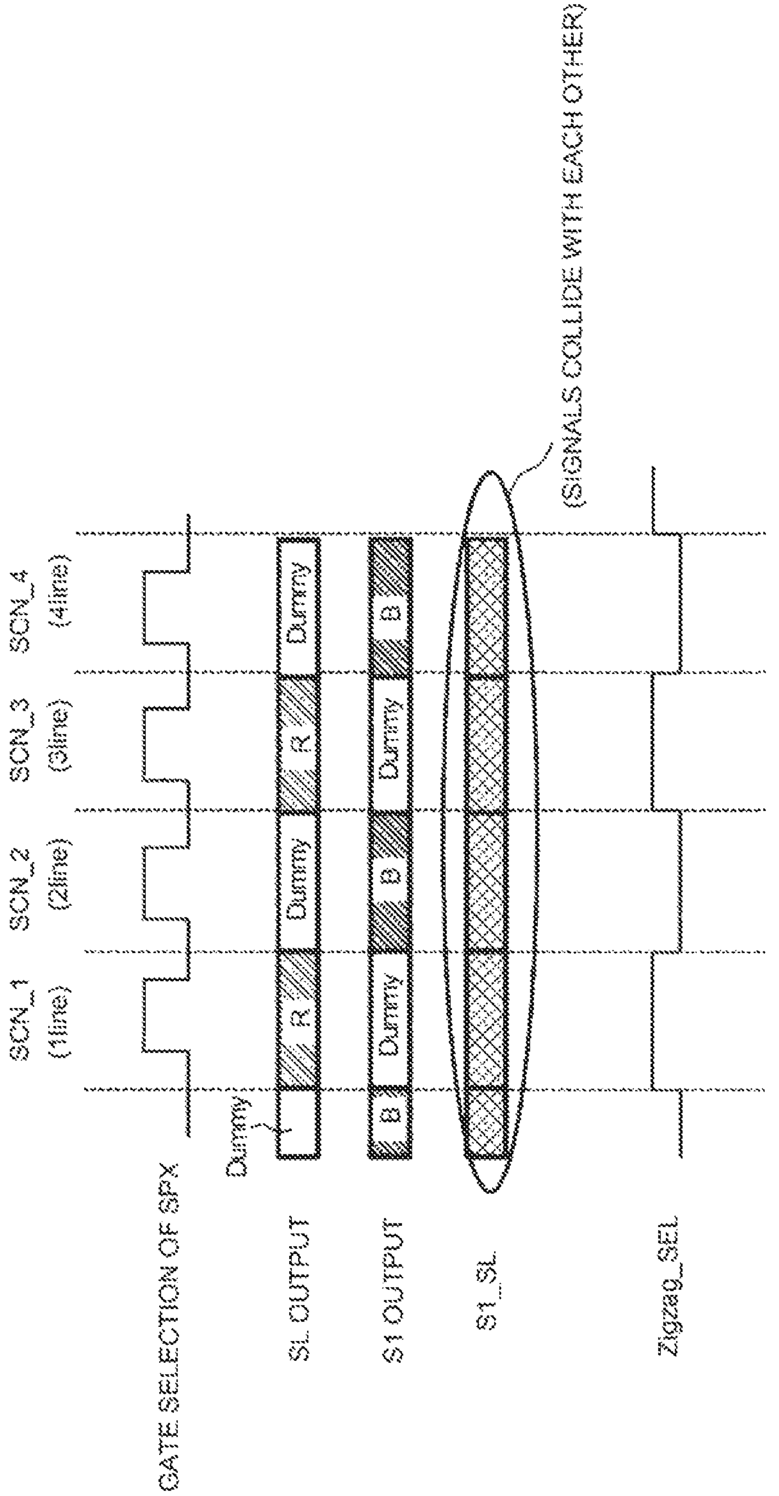
FIG. 6 is a timing diagram illustrating operations in case that dummy data is output in case that data of a sub-pixel to be originally displayed and driven is not present, as a comparative example of FIG. 5.

In FIG. 4, a gradation signal electrode ST_(r1, b800) is connected in common to the pre-stage gradation signal output terminal S1 and the next-stage gradation signal output terminal SL. In this case, as illustrated in FIG. 5, the gradation signal output terminal S1 outputs a blue gradation signal in even-numbered scanning lines SCN_2, . . . , and the outputs of the output buffers TRBUF(+) and TRBUF(−) which are connected to the gradation signal output terminal S1 are controlled at high impedance by the control signal HiZ_SEL in periods other than a period in which the blue gradation signal is output. The gradation signal output terminal SL outputs a red gradation signal in odd-numbered scanning lines SCN_1, SCN3, . . . , and the outputs of the output buffers TRBUF(+) and TRBUF(−) which are connected to the gradation signal output terminal SL are controlled at high impedance by the control signal HiZ_SEL in periods other than a period in which the red gradation signal is output. The control signal HiZ_SEL may be generated in response to the state of the signal Zigzag_SEL in accordance with a logic which is set in advance. As in FIG. 6, in case that appropriate dummy data (Dummy) is output in the period without performing high impedance control, the outputs of the gradation signal output terminals SL and S1 compete with each other, and thus display is disordered.

Therefore, according to the electronic apparatus ELDEV of FIG. 4, similarly to FIG. 1, in case that dot inversion drive in zigzag is performed on the display panel 1*m* using a plurality of display drivers 2_1*m* and 2_2*m* which are arranged in parallel, a new burden on the host device described in FIG. 12 is not imposed, and the transfer of sub-pixel data between the display drivers described in FIG. 11 is not also required, thereby allowing undesired competition of data between the display drivers for a specific gradation signal electrode to be excluded.

Further, the output buffers TRBUF(+) and TRBUF(−) which are capable of being connected to the gradation signal output terminals S1 and SL next to each other between a pair of display drivers 2_1*m* and 2_2*m* are configured such that the slew rate of a gradation signal is capable of being selected in accordance with the selection signal THR_RAT. Therefore, the pre-stage and next-stage gradation signal output terminals S1 and SL are connected in common to a gradation signal electrode which each takes charge of, and thus it is possible to cope with a case where the drive loads of the output buffers TRBUF(+) and TRBUF(−) increase.

In addition, in the point of using amorphous silicon in a semiconductor, it is suitable for conditions in which a low-cost display panel has to be adopted. However, the display drivers 2_1*m* and 2_2*m* require attention in that the drivers need gradation signal output terminals having a number corresponding to the number of gradation signal electrodes.

It goes without saying that the invention is not limited to the above embodiment, and various modifications and changes can be made without departing from the scope of the invention.

For example, the display panel is not limited to a liquid crystal panel, and may be a plasma panel, an EL (electroluminescence) panel, or the like. In addition, the magnitude of so-called dot inversion is not limited to the interval of one pixel, and may he the interval of two pixels, or the like.

The dummy data refers to a concept including invalid data.

What is claimed is:

1. An electronic apparatus comprising:

a display panel; and a plurality of display drivers which are disposed in series at an edge of the display panel in order to drive the display panel, wherein the display panel includes a plurality of sub-pixels in which selection terminals are connected to scanning signal electrodes and signal input terminals are connected to gradation signal electrodes, and wherein the plurality of sub-pixels form a plurality of scanning lines that extend in a direction of the scanning signal electrodes and a plurality of signal lines that extend in a direction of the gradation signal electrodes, and wherein the sub-pixels in a same signal line are alternately connected to adjacent gradation signal electrodes that are disposed on one of a first side of the same signal line and a second, opposite side of the same signal line, the display drivers are configured to supply gradation signals to a plurality of gradation signal electrodes in a parallel manner while driving the scanning signal electrodes in a predetermined order, wherein a first gradation signal output terminal disposed on a first display driver of the plurality of display drivers is adjacent to a second gradation signal output terminal disposed on a second display driver of the plurality of display drivers, wherein the first and second gradation signal output terminals are connected to a common gradation signal electrode of the gradation signal electrodes, and wherein the first and second display drivers are adjacently located to each other at the edge of the display panel and suppress an output of dummy data from the first and second gradation signal output terminals by using high impedance control associated with the first and second gradation signal output terminals to control an output of a gradation signal onto the common gradation signal electrode.

2. The electronic apparatus according to claim 1, wherein each of the display drivers includes a plurality of first output buffers that output a gradation signal of a first polarity to the gradation signal electrodes and a plurality of second output buffers that output a gradation signal of a second polarity, and includes an output switch circuit that switchably connects outputs of the first output buffers and the second output buffers to corresponding gradation signal output terminals.

3. The electronic apparatus according to claim 2, wherein every other sub-pixel in the same signal line is alternatively connected to adjacent gradation signal electrodes, and wherein the display drivers are configured to drive the gradation signal electrodes with the same polarity at an interval of one electrode using a plurality of the first output buffers and the second output buffers, and alternately switches drive polarities of the gradation signal electrodes in units of display frames.

4. The electronic apparatus according to claim 3, wherein the display panel includes an active element comprising a thin film transistor for each of the sub-pixels, the active element comprising amorphous silicon, and wherein the gradation signal output terminals correspond to the gradation signal electrodes one to one.

5. The electronic apparatus according to claim 3, wherein the display panel includes an active element comprising a thin film transistor for each of the sub-pixels, the active element comprising low-temperature polysilicon, wherein a respective gradation signal output terminal is allocated for each of three gradation signal electrodes of Red, Green, and Blue driven with the same polarity at an interval of one electrode with an input switch circuit interposed therebetween, and wherein the display drivers are configured to switch one of the gradation signal electrodes connected to a respective gradation signal output terminal in the input switch circuit in synchronization with switching of a driven scanning signal electrode.

6. The electronic apparatus according to claim 2, wherein one of the first output buffers and one of the second output buffers are configured to connect to the first and second gradation signal output terminals and are configured such that a slew rate of at least one of the gradation signal of the first and second polarities is capable of being selected in accordance with a selection signal.

7. The electronic apparatus according to claim 2, further comprising a host device that supplies display data to the plurality of display drivers, wherein the plurality of display drivers each include a common circuit configuration, and the host device divides a series of gradation data for each scanning line and supplies the divided data to each of the display drivers.

8. The electronic apparatus according to claim 1, wherein the first display driver is configured to place a first buffer coupled to the first gradation signal output terminal in a high impedance state based on a first high impedance control signal and the second display driver is configured to place a second buffer coupled to the second gradation signal output terminal in a low impedance state based on a second high impedance control signal such that only one of the first and second buffer outputs the gradation signal onto the common gradation signal electrode.

9. The electronic apparatus according to claim 8, wherein the first high impedance control signal is inverted relative to the second high impedance control signal.

10. The electronic apparatus according to claim 8, wherein the first and second high impedance control signals are derived based on transitions of a selection signal used to select a particular color of the plurality of sub-pixels to update in the display panel.

11. The electronic apparatus according to claim 1, the first and second gradation signal output terminals do not output dummy data.

12. A display driver comprising:

a plurality of gradation signal output terminals, arranged in parallel, configured to output gradation signals in a parallel manner;

a plurality of first output buffers configured to output a first gradation signal of a first polarity to the gradation signal output terminals;

a plurality of second output buffers configured to output a second gradation signal of a second polarity to the gradation signal output terminals;

an output switch circuit configured to switchably connect the first output buffers and second output buffers to corresponding gradation signal output terminals; and a timing control circuit configured to control an output of a third gradation signal to a corresponding gradation signal output terminal from each of the first output buffers and the second output buffers in synchronization with display timing while alternately switching a switch state of the output switch circuit at a predetermined timing, wherein outputs of the first output buffers and the second output buffers that are selectively connected to gradation signal output terminals located on opposite ends of the display driver are configured to be selectively controlled in a high impedance state, and wherein the timing control circuit is configured to control the outputs in the high impedance state based on a dummy data output timing of one of the first output buffers and the second output buffers that are selectively connected to the gradation signal output terminals located on opposite ends of the display driver.

13. The display driver according to claim 12, wherein the predetermined timing is a timing which is synchronized with switching of a display frame.

14. The display driver according to claim 12, wherein one of the first output buffer and the second output buffer that are selectively connected to the gradation signal output terminals located on opposite ends of the display driver is configured such that a slew rate of one of the first and second gradation signal is capable of being selected in accordance with a selection signal.

15. The display driver according to claim 12, wherein the output switch circuit is configured to drive gradation signal electrodes with a same polarity at an interval of one electrode using the first and second output buffers, and alternately switches drive polarities of the gradation signal electrodes in units of display frames.

16. The display driver according to claim 12, wherein the first output buffers and the second output buffers that are selectively connected to gradation signal output terminals located on opposite ends of the display driver do not output dummy data.

17. A display driver which is formed in one semiconductor substrate, the display driver comprising:

a plurality of gradation signal output terminals, arranged in parallel, configured to output gradation signals in a parallel manner;

a plurality of first output buffers configured to output a first gradation signal of a first polarity to the gradation signal output terminals;

a plurality of second output buffers configured to output a second gradation signal of a second polarity to the gradation signal output terminals;

an output switch circuit configured to switchably connect the first output buffers and second output buffers to corresponding gradation signal output terminals; and a timing control circuit configured to control an output of a third gradation signal to a corresponding gradation signal output terminal from each of the first output buffers and the second output buffers in synchronization with display timing while alternately switching a switch state of the output switch circuit at a predetermined timing, wherein outputs of the first output buffers and the second output buffers that are selectively connected to gradation signal output terminals located on opposite ends of the display driver are configured to be selectively controlled in a high impedance state, and wherein the timing control circuit is configured to suppress an output of dummy data from at least one of the first output buffers and at least one of the second output buffers that are selectively connected to the gradation signal output terminals located on opposite ends of the display driver by using a high impedance control signal of the at least one of the first output buffers and the at least one of the second output buffers.

18. The display driver according to claim 17, wherein the predetermined timing is a timing which is synchronized with switching of a display frame.

19. The display driver according to claim 17, wherein the output switch circuit is configured to drive gradation signal electrodes with a same polarity at an interval of one electrode using the first and second output buffers, and alternately switches drive polarities of the gradation signal electrodes in units of display frames.

20. The display driver according to claim 17, wherein the first output buffers and the second output buffers that are selectively connected to gradation signal output terminals located on opposite ends of the display driver do not output dummy data.

* * * * *